United States Patent [19]

Okazaki et al.

[11] Patent Number: 5,389,422
[45] Date of Patent: * Feb. 14, 1995

[54] BIAXIALLY ORIENTED LAMINATED FILM

[75] Inventors: Iwao Okazaki; Koichi Abe, both of Kyoto; Shoji Nakajima, Otsu, all of Japan

[73] Assignee: Toray Industries, Inc., Tokyo, Japan

[*] Notice: The portion of the term of this patent subsequent to Dec. 3, 2008 has been disclaimed.

[21] Appl. No.: 940,382

[22] Filed: Sep. 3, 1992

[51] Int. Cl.$^6$ .............................................. D06N 7/04
[52] U.S. Cl. .................................... 428/141; 428/323; 428/336; 428/480; 428/694 ST; 428/694 SG
[58] Field of Search .................. 428/323, 480, 694 ST, 428/694 SG, 900, 910, 141, 336, 195, 206, 207

[56] References Cited

U.S. PATENT DOCUMENTS

| | | | |
|---|---|---|---|
| 4,489,117 | 12/1984 | Ono et al. | 428/147 |
| 4,550,049 | 10/1985 | Ono et al. | 428/141 |
| 4,687,700 | 8/1987 | Hensel et al. | 428/213 |
| 5,069,962 | 12/1991 | Okazaki et al. | 428/323 |

FOREIGN PATENT DOCUMENTS 59-171623 9/1984 Japan.
63-265636 11/1988 Japan.

Primary Examiner—D. S. Nakarani
Assistant Examiner—H. Thi Le
Attorney, Agent, or Firm—Fish & Richardson

[57] ABSTRACT

Disclosed is a biaxially oriented laminated film comprising a film layer B whose major component is a thermoplastic resin $B_r$, a thin film layer A laminated on at least one surface of the film layer B and whose major components are a thermoplastic resin $A_r$ and particles with a specified mean diameter contained therein at a specified content, and a skin layer C laminated on at least one surface of the laminated film layer A and film layer B and having a thickness of 1–300 nm. The particles form the desired protrusions on the film surface and the skin layer C can have various properties such as a good adhesive property with a magnetic layer, a good adhesive property with an ink or a good antistatic property without injuring the good scratch resistance, chipping resistance, chromatic S/N, etc., achieved by the desired protrusions formed by the particles.

17 Claims, No Drawings

BIAXIALLY ORIENTED LAMINATED FILM

BACKGROUND OF THE INVENTION

1. Field of the Invention

The present invention relates to a biaxially oriented laminated film, and more particularly to a biaxially oriented laminated thermoplastic film having improved surface properties suitable for the base film of a magnetic recording media.

2. Description of the Prior Art

As a biaxially oriented laminated thermoplastic film aimed to improve the surface properties, a biaxially oriented polyester film containing practically spherical particles of colloidal silica is known and described in, for example, JP-A-SHO 59-171623. In such a biaxially oriented laminated thermoplastic film, protrusions are formed on the surface by the contained silica particles. By such formation of the protrusions, it may be possible to increase the handling ability and the running ability of the film by reducing the friction coefficient of the surface of the film, to improve the adhesive property of the film with a magnetic layer for use of a magnetic recording media, or to improve the adhesive property of the film with an ink for use of a package.

In the biaxially oriented laminated thermoplastic film disclosed in JP-A-SHO 59-171623, however, since the contained silica particles are randomly distributed over the entire area in the thickness direction of the film, increase of the density of the protrusions formed by the contained particles is restricted to some extent, and the height of the protrusions varies greatly. Therefore, improvement of the running ability of the film achieved by the reduction of the friction coefficient of the film surface, increase of the scratch prevention property (hereinafter, referred to as scratch resistance) of the film surface and the chipping resistance of the film surface, and increase of the adhesive property of magnetic layer or ink to the film surface, are limited to some extent.

Accordingly, the inventors of the present invention proposed a biaxially oriented laminated thermoplastic film in U.S. Pat. No. 5,069,962, which is improved in surface properties by laminating a layer of thermoplastic resin A and a layer of thermoplastic resin B and containing particles having a specified size concentratively in the layer of thermoplastic resin A. By this proposal, protrusions having a uniform height can be formed on the film surface efficiently and at a high density, and the running ability, scratch resistance, chipping resistance and adhesive property of magnetic layer or ink of the film can be greatly improved.

The inventors of the present invention have further proceeded the investigation. As a result, it has been found that a biaxially oriented laminated thermoplastic film having a more excellent surface properties can be made by further laminating another layer on the previously proposed biaxially oriented laminated film.

SUMMARY OF THE INVENTION

An object of the present invention is to provide a biaxially oriented laminated film on which protrusions with a desired uniform height are formed at a high density to increase the scratch resistance and the chipping resistance of the surface, and at the same time, which can have excellent properties depending on uses, particularly excellent adhesive property with a magnetic layer and antistatic property for use of a magnetic recording media or excellent adhesive property with an ink for use of printing, by adding another layer to the laminated film.

To accomplish this object, a biaxially oriented laminated film according to the present invention includes a film layer B whose major component is a thermoplastic resin $B_r$, a film layer A laminated on at least one surface of the film layer B and whose major components are a thermoplastic resin $A_r$ and particles contained therein, and a skin layer C laminated on at least one surface of the laminated film layer A and film layer B and having a thickness of 1–300 nm. The film layer A has a thickness of 0.005–3 $\mu$m, the particles contained in the film layer A has a mean diameter of 0.1 to 10 times the film layer A, and the content of the particles in the film layer A is in the range of 0.5–50% by weight.

In the biaxially oriented laminated film according to the present invention, protrusions with a desired and uniform height are formed on the surface of the film at a high density by the particles contained in the film layer A. The film surface can have excellent scratch resistance and chipping resistance. Moreover, since the skin layer C is laminated on at least one surface of the laminated film, the properties required depending upon uses, such as adhesive property with a magnetic layer and antistatic property for use of a magnetic recording media and adhesive property with an ink for use of printing, can be greatly improved by the existence of the skin layer C.

DETAILED DESCRIPTION OF THE PREFERRED EMBODIMENTS OF THE INVENTION

Next, the present invention will be explained in more detail by embodiments and examples. However, the present invention is not restricted by the embodiments and examples.

Although the thermoplastic resin $A_r$ of the biaxially oriented laminated film according to the present invention is not particularly restricted, for example, polyester, polyolefine, polyamide or polyphenylene sulfide can be employed. Particularly, polyester is preferable as the thermoplastic resin $A_r$. Among polyesters, a polyester containing at least one of ethylene terephthalate, ethylene $\alpha,\beta$-bis(2-chlorophenoxy)ethane-4,4'-dicarboxylate and ethylene 2,6-naphthalate as its main constituent is particularly preferable, because desired protrusions with a uniform height can be more easily formed at a high density.

Further, the thermoplastic resin $A_r$ is preferably a crystalline resin in order to easily form desired protrusions on the surface thereof. Where, the "crystalline" means "not amorphous", and quantitatively, is determined that the cold crystallization temperature Tcc of the resin is determined and the crystallization parameter $\Delta$ Tcg, which is the difference between the cold crystallization temperature Tcc and the glass transition temperature Tg, is not greater than 150° C. Further, the crystallinity of the resin is preferably at a level represented by the heat of melting of the resin determined by a differential scanning calorimeter of not less than 7.5 cal/g in order to get a particularly excellent protrusion forming ability. Furthermore, the thermoplastic resin $A_r$ is preferably a resin whose main component is ethylene terephthalate, because a particularly excellent protrusion forming ability can be obtained. In the thermoplastic resin $A_r$, two or more kinds of thermoplastic resins may be blended and a copolymerized polymer may be used, unless the advantages according to the present invention are damaged.

Although the shape of the particles in the thermoplastic resin $A_r$ is not particularly restricted, the particle size ratio of the particles (the ratio of average longer diameter/average shorter diameter of the particles) is preferably in the range of 1.0–1.3, particularly spherical particles are preferable, because protrusions with a uniform height can be easily formed on the film surface.

The particles preferably has a relative standard deviation of particle size of not greater than 0.6, more preferably not greater than 0.5, because desired protrusions may be uniformly formed.

Although the kind of the particles in the thermoplastic resin $A_r$ is not particularly restricted, in order to satisfy the above desired characteristics of the particles, alumina silicate, agglomerated silica particles and nonincorporated particles are not preferred. The particles are preferably substantially spherical silica particles originating from colloidal silica or crosslinked polymer particles (for example, crosslinked divinylbenzene or crosslinked silicone particles). Particularly, the crosslinked polymer particles which is increased in the degree of crosslinkage determined by a 10% weight reduction temperature (determined in nitrogen gas by heat weight analysis apparatus TG-30M produced by Shimadzu Corporation, under a heating rate of 20° C./min.) to the 10% weight reduction temperature of not less than 380° C., are preferable, because the protrusion forming property on the film surface becomes better. In the case where the silica particles originating from colloidal silica are employed, it is preferable to use the substantially spherical silica particles prepared by alkoxide method with a low sodium content. However, other particles such as calcium carbonate, titanium dioxide and alumina particles may also be employed by controlling the mean diameter thereof relative to the thickness of the film layer.

The thickness of the film layer A whose major component is a thermoplastic resin $A_r$ is in the range of 0.005–3 μm, preferably in the range of 0.01–1 μm, and more preferably in the range of 0.03–0.5 μm. If the thickness of the film layer A is less than the above range, the durability of the laminated film layer cannot be maintained. If the thickness of the film layer is greater than the above range, it is difficult to form protrusions with a desired height at a high density from the relationship between the thickness and the size of the contained particles.

The mean diameter of the particles contained in the thermoplastic resin $A_r$ is in the range of 0.1 to 10 times the thickness of the film layer A, preferably in the range of 0.5 to 5 times and more preferably in the range of 1.1 to 3 times the thickness of the film layer A. If the ratio of the mean diameter/the thickness of the film layer A is less than the above range, the dispersion of the size of the protrusions formed on the film surface is great and the scratch resistance and the chipping resistance obtained deteriorate. If the ratio of the mean diameter/the thickness of the film layer A is greater than the above range, the height of the protrusions formed on the film surface is nonuniform and the reduction of the particle density ratio at surface layer (described later in more detail) is likely to occur, and similarly the obtained scratch resistance and chipping resistance deteriorate.

The mean diameter of the particles, under the condition where the particles are contained in the thermoplastic resin $A_r$, is preferably in the range of 0.005–3 μm, more preferably in the range of 0.02–2 μm, because the scratch resistance and the chipping resistance of the film surface can be more improved.

In the present invention, such particles are contained in the film layer A of the thermoplastic resin $A_r$ by 0.5–50% by weight. If the content of the particles is less than the above range, a good property for transferring the irregularity of the protrusions to the magnetic layer because the density of the protrusions becomes too low. If the content of the particles is greater than the above range, the laminated film layer A itself becomes too fragile because the rate of the contained particles to the matrix resin is too high.

The mean height of the protrusions formed on the surface of the film layer A by the above particles is not less than 1/5 of the mean diameter of the particles. The protrusions on the film surface having such a mean height can be obtained by adequately selecting the mean diameter of the particles from the aforementioned range depending upon the thickness of the film layer A.

Thus, in the present invention, the particles having a mean diameter near the value of the thickness of the film layer A or larger than the value are contained in the film layer A of the thermoplastic resin $A_r$. In other words, fine particles having a mean diameter near the value of the thickness of a very thin film layer or larger than the value are contained in the very thin film layer. Therefore, the particles are concentratively distributed substantially only in the thin laminated film layer A in the film thickness direction relative to the entire laminated film. As a result, the density of the particles in the laminated film layer A can be easily increased, and the density of the protrusions formed by the particles can be easily increased. Moreover, since the position of the particles is regulated in the film thickness direction relative to the entire laminated film by containing the particles in the laminated film layer A and the relationship between the thickness of the film layer A and the mean diameter of the particles is in the range aforementioned, the height of the protrusions formed by the particles can be very uniform. Thus, the protrusions with a uniform height are formed at a high density on the surface of the laminated film, and therefore, the scratch resistance and the chipping resistance of the film surface can be greatly increased.

The above film layer A whose main components are the thermoplastic resin $A_r$ and the particles contained therein is laminated on the film layer B whose main component is the thermoplastic resin $B_r$.

The thermoplastic resin $B_r$ is prepared from a resin similar to the thermoplastic resin $A_r$. The thermoplastic resin $B_r$ may be the same resin as the thermoplastic resin $A_r$, or may be a different resin from the thermoplastic resin $A_r$. The film layer A of the thermoplastic resin $A_r$ is laminated on both or one of the surfaces of the film layer B of the thermoplastic resin $B_r$. Namely, the lamination structure is A/B/A or A/B. Where, the kinds of the thermoplastic resins of layers A and B may be the same or may be different. At least one surface of the laminated film must be formed from layer A.

The thermoplastic resin $B_r$ is preferably a crystalline resin. Particularly, when the Δ Tcg of the thermoplastic resin $B_r$ is in the range of 20°–100° C., the durability of the laminated film can be increased, for example, the durability of a base film for a magnetic recording media can be increased when the laminated film used as the base film. For example, as such a resin, polyester, polyamide, polyphenylene sulfide and polyolefine are raised.

Among these resins, polyester is preferable because a higher durability of the entire laminated film can be obtained. Among polyesters, a polyester containing at least one of ethylene terephthalate, ethylene $\alpha,\beta$-bis(2-chlorophenoxy)ethane-4,4'-dicarboxylate and ethylene 2,6-naphthalate as its main constituent is preferable as the material of the film layer B of the laminated film for use as a base film of a magnetic recording media. In the thermoplastic resin $B_r$, other components may be copolymerized as long as the content of the other components is within 5 mol %, unless the advantages according to the present invention are damaged and the crystallinity of the thermoplastic resin $B_r$ is injured.

In the thermoplastic resin $B_r$, other polymers may be blended as long as the objects of the present invention are not injured. Further, a generally used additive, for example, oxidation inhibitor, thermal stabilizer, lubricant, ultraviolet absorbent etc., may be added by the volume which does not substantially decrease the advantages according to the present invention.

Although it is not necessary that particles are contained in the film layer B of the laminated film, in the case where the film layer B forms one of the surfaces of the laminated film, it is preferred that particles having a mean diameter of 0.01–3 $\mu$m, more preferably 0.02–2 $\mu$m, are contained at a content of 0.001–3 wt %, preferably 0.005–2 wt %, more preferably 0.005–1 wt %, for example, for use of the base film of a magnetic recording media, because not only the friction coefficient and scratch resistance of the base film become good but also the roll formation of the base film becomes good. The kind of the contained particles is preferably the same as that of the particles contained in the layer A. However, the kinds and sizes of the particles contained in the layers A and B may be the same or different from each other.

The thermoplastic resin $A_r$ containing the above-described particles and the thermoplastic resin $B_r$ are laminated by coextrusion, the laminate is formed as a sheet and the sheet is biaxially oriented to form a biaxially oriented thermoplastic resin film. The "lamination by coextrusion" according to the present invention means that the thermoplastic resin $A_r$ containing particles and the thermoplastic resin $B_r$ are extruded from different extruders, respectively, and the extruded resins are laminated before the resins are delivered out from a die as a sheet. Although this lamination may be performed in a die provided for forming a sheet, for example, in the manifold of the die, it is preferred that the lamination is performed in a connecting pipe provided upstream of the die, from the viewpoint of the fact that the laminated layer is very thin as aforementioned. Particularly, the lamination portion in the connecting pipe is preferably formed as a rectangular portion, because a lamination uniform in the width direction of the film can be easily realized by such a lamination portion. The molten polymer laminated in the lamination portion of the connecting pipe is widened to a predetermined width in the manifold of the die, and after being delivered out from the die as a sheet, the sheet is stretched biaxially. Therefore, even if the laminated film layer after the biaxial orientation is very thin, the thermoplastic resin polymer containing particles can be laminated with a fairly large thickness in the lamination portion of the connecting pipe, and the polymer can be laminated easily and at a high accuracy.

In the biaxially oriented film composed of the above thermoplastic resin $A_r$ and the thermoplastic resin $B_r$, the particle density ratio at surface layer due to the particles present on the laminated film layer containing particles is preferably not more than 0.1. This particle density ratio at surface layer is used as an index which quantitatively indicates at what degree the particles forming the protrusions on the film surface are covered by the thin layer of the thermoplastic resin $A_r$, as shown in the determination method described later. As the degree at which the particles are directly exposed on the film surface is higher, the particle density ratio at surface layer becomes higher. As the degree at which the particles are covered by the thermoplastic resin $A_r$ is higher, the particle density ratio at surface layer becomes lower. When the particles forming the protrusions are sufficiently covered by the thin layer of the thermoplastic resin $A_r$, the particles can be held by the laminated layer, and further by the base film layer of the thermoplastic resin $B_r$, even if the particles are distributed at a high density. Therefore, by controlling the particle density ratio at surface layer to a value not more than the above value, the falling of the particles etc. can be prevented and the durability of the film surface can be maintained high. Such a particle density ratio at surface layer can be achieved by the lamination by coextrusion. Although a film similar to the film according to the present invention can be made by coating, namely although a resin layer can be coated with a very small thickness onto a base film layer and particles can be contained in the coating resin layer, the particle density ratio at surface layer obtained becomes extremely high (that is, the degree at which the particles are exposed on the film surface becomes extremely high), the film surface obtained is very brittle as compared with that according to the present invention.

In the present invention, the above laminated film composed of the thermoplastic resin $A_r$ and the thermoplastic resin $B_r$ is biaxially oriented. If the film is a non-oriented film, good S/N and scratch resistance cannot be obtained. Although the degree of the biaxial orientation is not particularly restricted, Young's modulus representing the degree of molecular orientation is preferably not less than 350 kg/mm$^2$ in both of the longitudinal and transverse directions, more preferably not less than 400 kg/mm$^2$, because the scratch resistance of the film can be increased. If only the surface portion is not biaxially oriented but uniaxially oriented, a satisfactory scratch resistance cannot be obtained. Namely, the molecules near the surface must be biaxially oriented. The molecular orientation of the surface layer can be determined by total reflection Raman spectroscopic analysis or infrared spectroscopic analysis.

In the laminated film according to the present invention, it is preferred that the particles are unevenly distributed within the depth, which is seven times (preferably five times, more preferably three times) the mean diameter of the particles, from the surface of the film layer A in the thickness direction of the biaxially oriented laminated film. More excellent S/N and scratch resistance can be obtained by such an uneven distribution. Where, such an uneven distribution, namely, the condition that the particles concentratively exist in a very thin layer adjacent to the film surface, has the following meanings.

a) The dispersion of the distance from the film surface to the particles can be suppressed small. Therefore, the uniformity of the height of the protrusions can be achieved by using the particles a uniform diameter. (Fine particles which do not injure the uniformity of the height of the protrusions are not necessary to be unevenly distributed near the film surface.)

b) Since the particles concentratively exist near the film surface, the number of the protrusions formed on the film surface can be remarkably increased as compared with that in the conventional film in which the particles are distributed uniformly in the thickness direction, and the density of the protrusions can be greatly increased.

The above high uniformity of the height of the protrusions and high density of the protrusions greatly contribute improvement of S/N for use of a magnetic recording media and increase of the scratch resistance of the film surface.

In the present invention, in the portion near at least one surface of the film in the thickness direction, the particle density D1 in the region within the depth of 1.5 times the mean diameter of the particles from the film surface (the number of the particles existing in the region within the depth of 1.5 times the mean diameter of the particles is divided by the area of the film surface corresponding to the region) is preferably not less than 80,000/mm$^2$, more preferably not less than 100,000/mm$^2$, further more preferably not less than 200,000/mm$^2$. Better S/N and scratch resistance can be achieved by such a condition.

Further, with at least one surface of the film according to the present invention, the thickness of the layer, which has a particle density of not less than 80,000/mm$^2$, is preferably not more than three times the mean diameter of the particles. By such a condition, better S/N and scratch resistance can be achieved.

In the film according to the present invention, in the region other than the portion near the film surface within the depth of 1.5 times the mean diameter of the particles from the film surface, the particle density D2 of particles having diameters greater than the mean diameter of the above particles (the number of the particles existing in the entire region other than the region within the depth of 1.5 times the mean diameter of the above particles is divided by the area of the film surface corresponding to the former region) is preferably not more than 1/10 of the particle density D1, more preferably not more than 1/20. Better S/N and scratch resistance can be achieved by such a condition.

In the film according to the present invention, the particles existing near the film surface form protrusions on the film surface. The thickness of the skin of the thermoplastic resin above the protrusions (surface skin) is preferably in the range of 5–200 nm, more preferably 10–150 nm, and further preferably 15–120 nm. Better scratch resistance can be achieved by such a condition.

In the film according to the present invention, the relative standard deviation of the distribution of the height of the protrusions is preferably not more than 0.6, more preferably not more than 0.55, further preferably not more than 0.5 to obtain better S/N and scratch resistance.

The mean height of the protrusions on the film surface is preferably in the range of 10–500 nm, more preferably 20–300 nm, and further preferably 20–200 nm. Better S/N and scratch resistance can be achieved by such a condition.

The dispersion of the relative standard deviation of the distribution of the height of the protrusions, determined on 10 m in the longitudinal direction, (=100×(the maximum value−the minimum value)/- mean value (unit:%)) is preferably not more than 40% to achieve better S/N and scratch resistance.

In the film according to the present invention, the particles may concentratively exist near one surface of the film, or may concentratively exist near both surfaces of the film. Further, the particles having different diameters or different kinds of particles may be unevenly distributed near the respective film surfaces.

In the film according to the present invention, the area ratio of the protrusion portions with respect to the protrusions formed on at least one surface is preferably in the range of 6–90%, more preferably 15–85%, further preferably 20–80%. Where, although the protrusion portions can be recognized by the photograph of the surface taken by a differential interference microscope, more quantitatively the "protrusion portions" means the protrusions having heights greater than about 15 nm which can be recognized as protrusions by a two beam and two detector type scanning electron microscope. If the area ratio of the protrusion portions is less than the above range, a good S/N cannot be obtained. If the area ratio of the protrusion portions is greater than the above range, a good scratch resistance cannot be obtained.

Further in the film according to the present invention, the flat portions other than the above protrusion portions preferably do not have wavinesses to achieve better scratch resistance and S/N. Such a waviness is usually liable to occur by pushing up due to the particles contained in the interior of the film. Although the waviness can be recognized by the photograph of the surface taken by a differential interference microscope, more quantitatively the waviness can be determined by a pin-touch type surface roughness tester, a non-contact type surface roughness tester or a two beam and two detector type scanning electron microscope, and the amplitude of the waviness determined by such a means is preferably not more than 10 nm. In the case where the above local determination is difficult, the waviness can be determined by analyzing the roughness curve of the film surface by frequency, taking out the wavinesses having wave lengths of not less than 50 μm, and determining the waviness of the flat portions other than the protrusion portions from the wavinesses taken out. In such a determination method, the waviness index which represents the amplitude of the waviness is preferably not more than 50 nm, more preferably not more than 40 nm.

In the present invention, a skin layer C having a thickness of 1–300 nm is laminated on at least one surface of the above-described laminated film composed of the thermoplastic resin $A_r$ and the thermoplastic resin $B_r$.

As the lamination structure of the film, any of layer A/layer B/layer C, layer C/layer A/layer B, layer A/layer B/layer A/layer C and layer C/layer A/layer B/layer A/layer C can be employed. Particularly, the lamination structure of layer A/layer B/layer C is preferable.

The above lamination of the layer C can be performed in any process in the film production process. However, because the layer C is a very thin skin layer, it is desired that rollers etc. do not come into contact with the surface of the layer C until the layer C or the film is formed and solidified after the layer C has been laminated. Therefore, for example, the lamination of the layer C is preferably performed before or after the transverse stretching in a sequential biaxial stretching process which conducts transverse stretching after longitudinal stretching, or performed before stretching in a simultaneous biaxial stretching process. Industrially, the lamination is preferably conducted by so-called inline coating wherein the coating is performed in a continuous film production process, but the lamination may be performed by an off-line process.

The layer C thus laminated can be adopted to various embodiments in accordance with the object or use of the film.

The layer C is laminated as a skin layer having a thickness of 1–300 nm. The skin layer comprises, for example, the composition whose major components are a water soluble polymer and a silane coupling agent, and the skin layer is laminated by, for example, in-line coating. Such a lamination of the layer C is suitable for use of a metal thin layer type magnetic recording media. Since the layer C is very thin, the advantages due to the protrusions formed on the surface of the layer A side by the particles contained in the layer A, which have a high density and a uniform height, can be maintained substantially as they are. Additionally, the durability of the film surface of the layer C side (including the durability of the surface of the magnetic layer when the magnetic layer is provided on the layer C) can be greatly increased, and S/N obtained when the film is formed as a magnetic recording media can be greatly improved, by the effect due to the lamination of the layer C. If the thickness of the skin layer is out of the range of 10–300 nm, it is difficult to satisfy the durability and the S/N of the surface of the magnetic layer, as shown in Table 1. However, when the thickness of the skin layer is within the above range, both characteristics can be satisfied.

TABLE 1

| Thickness of skin layer | Durability | S/N |
|---|---|---|
| greater than the range | O | X |
| smaller than the range | X | O |

In the above, in a film wherein there is not a layer A containing specified particles, that is, in the conventional film, even if the above layer C is provided, both the durability and S/N cannot be satisfied.

The layer C can have various functions depending upon uses of the film.

In order to give a good adhesive property with a magnetic layer or an ink to the layer C, various compounds such as high solid type, nonaqueous dispersion type, emulsion type, nonsolvent type, water soluble or water dipersible type or organic solvent type compounds can be coated on the film to form the layer C. More concretely, polyester resin, acrylic resin and urethane resin can be used as such a material forming the layer C having a good adhesive property.

As the polyester resin giving a good adhesive property, copolyesterether resin or ester forming alkali metal sulfonate compound can be preferably employed. As the aromatic dicarboxylic acid component of the copolyesterether resin, terephthalic acid, isophthalic acid, phthalic acid, 2,5-dimethylterephthalic acid, 1,4-naphthalene dicarboxylic acid, biphenyl dicarboxylic acid, 2,6-naphthalene dicarboxylic acid, 1,2-bis(phenoxy)ethane -p,p'-dicarboxylic acid and ester forming derivatives thereof can be used. As the ester forming alkali metal sulfonate compound, alkali metal salt such as sulfoterephthalic acid, 5-sulfoisophthalic acid, 4-sulfoisophthalic acid, 4-sulfonaphthalene-2,7-dicarboxylic acid, sulfo-p-xyleneglycol and 2-sulfo-1,4-bis(hydroxyethoxy)benzene (alkali metal sulfonate) and ester forming derivatives thereof can be used. Among the above ester forming alkali metal sulfonate compounds, sodium of 5-sulfoisophthalic acid or sulfoterephthalic acid and ester forming derivatives thereof are the most preferable.

As the acrylic resin, water soluble or water dispersible acrylic resin can be employed. As the water soluble or water dispersible acrylic resin, the resin whose major component is alkylacrylate or alkylmethacrylate is preferable, and the water soluble or water dispersible resin containing 30–90 mol % acid component and 70–10 mol % vinyl monomer component which can be copolymerized with the acid component and has a functional group is preferable.

The vinyl monomer component, which can be copolymerized with alkylacrylate or alkylmethacrylate and has a functional group, preferably has a functional group which can make the water dispersible property of the resin good by giving a hydrophilic property to the resin or which make the adhesive property with other layers good. As the preferable functional group, carboxylic group or the salt thereof, acid anhydride group, sulfonic acid group or the salt thereof, amide group or alkylol amide group, amino group (including substituted amino group) or alkylol amino group or salt thereof, hydroxyl group or epoxy group can be employed. Particularly preferable functional group is carboxylic group or the salt thereof, acid anhydride group or epoxy group. Two or more kinds of these groups may be contained in the resin.

The reason why it is preferred that alkylacrylate or alkylmethacrylate in the acrylic resin is not less than 30 mol %, is that the forming ability, strength and blocking resistance of the coating layer increased. The reason why it is preferred that alkylacrylate or alkylmethacrylate in the acrylic resin is not more than 90 mol %, is that water soluble or water dispersible acrylic resin can be easily obtained by introducing the compound having the specified functional group as the copolymerizing component, as well as the water soluble or water dispersible condition can be stably maintained for a long period of time, and further, the improvement of the adhesive property of the coating layer with the base film, the improvement of the strength, water resistance and chemical resistance of the coating layer due to the reaction in the coating layer, and the improvement of the adhesive property of the base film with other materials.

As the alkyl group of alkylacrylate or alkylmethacrylate, methyl group, ethyl group, n-propyl group, isopropyl group, n-butyl group, isobutyl group, t-butyl group, 2-etylhexyl group, lauryl group, stearyl group or cyclohexane group can be employed.

As the vinyl monomer component, which has a functional group capable of copolymerizing with alkylacrylate or alkylmethacrylate, the following compounds having functional groups of reactant type functional group, self-crosslinkage type functional group and hydrophilic group can be used.

As the compound containing carboxylic group or the salt thereof, or acid anhydride group, acrylic acid, methacrylic acid, itaconic acid, maleic acid, fumaric acid, crotonic acid, metal salt or ammonium salt with the sodium of these carboxylic acid, or maleic acid anhydride can be used.

As the compound containing sulfonic acid group or the salt thereof, vinyl sulfonic acid, styrene sulfonic acid, metal salt or ammonium salt with the sodium of these sulfonic acid can be used.

As the compound containing amide group or alkylol amide group, acrylic amide, methacrylic amide, N-methylmethacrylic amide, methylol acrylic amide, methylol methacrylic amide, ureido-vinylether, $\beta$-ureido-isobutylvinylether, or ureido-ethyl acrylate can be used.

As the compound containing amino group or alkylol amino group or salt thereof, diethylaminoethylvinylether, 3-aminopropylvinylether, 2-aminobutylvinylether, dimethylaminoethylmethacrylate, dimethylaminoethylvinylether or methylol of amino group thereof, the compound which made as tetra salt by alkyl halide, dimethyl sulfuric acid or salt thereof, can be used.

As the compound containing hydroxyl group, $\beta$-hydroxyethylacrylate, $\beta$-hydroxyethylmethacrylate, $\beta$-hydroxypropylacrylate, $\beta$-hydroxypropylmethacrylate, $\beta$-hydroxyvinylether, 5-hydroxypentylvinylether, 6-hydroxyhexylvinylether, polyethylene glycol monoacrylate, polyethylene glycol monomethacrylate, polypropylene glycol monoacrylate or polypropylene glycol monomethacrylate can be used.

As the compound containing epoxy group, glycydil acrylate or glycydil methacrylate can be used.

Further, the following compounds other than the above-described compounds may be used together with the above compounds. Namely, acrylonitrile, methacrylonitrile, styrene, butylvinylether, maleic acid mono- or dialkylester, fumaric acid mono- or dialkylester, itaconic acid mono- or dialkylester, methylvinylketone, vinyl chloride, vinylidene chloride, vinyl acetate, vinyl pyridine, vinyl pyrolidone or vinyl trimethoxysilane can be employed, but the compound used is not particularly restricted by these compounds.

Although the acrylic resin may contain a surface active agent, the surface active agent of the low molecular component contained in the acrylic resin may decrease the mechanical properties and water resistance of the coating layer and the adhesive property of the coating layer with the other laminated layer. In such a case, the polymer which does not contain a surface active agent, so-called soap free polymer, can be employed. Among such polymers, the water dispersible acrylic resin, wherein the trunk polymer is a copolymer of methylmethacrylate and ethylacrylate of 35/65–65/35 and —COOH and —CH$_3$OH are introduced by 1–5 wt %, respectively, is preferable for obtaining a good adhesive property and transparency of the resin layer.

Further, to improve the adhesive property, water resistance, solvent resistance and mechanical properties of the coating layer, the coating layer may contain a reactant compound such as methylol or alkylol urea melamine, acrylamide or polyamide resin, epoxy compound, blockpolyisocyanate, vinyl compound as the crosslinkage agent. Furthermore, as needed, antifoaming agent, coating improving agent, thickener, antistatic agent, oxidation inhibitor, ultraviolet ray absorbing agent, color or pigment may be contained.

The coating method is not particularly restricted. Although extrusion lamination method or melt coating method may be employed, gravure coating, reverse coating, spray coating, kiss coating, die coating and metering bar coating are preferable to coat a thin layer at a high speed. If a surface treatment such as corona discharge treatment in air or other atmosphere is conducted before the resin is coated on the base film, not only the coating property can be improved but also the coating layer can be formed more strongly. Although the drying condition is not particularly restricted, it is preferred that the drying is performed in a condition which does not injure the properties of the base film.

Further, in order to give a good adhesive property to the laminated film according to the present invention, it is preferred that a low crystallinity resin having a crystallization parameter $\Delta$ Tcg of not less than 80° C. is laminated as the layer C. Although both of coating and coextrusion are possible for laminating the resin on the base film by controlling the crystallization parameter $\Delta$ Tcg of the resin to be not less than 80° C., coextrusion is more preferable. The adhesive property with a magnetic layer in use of a magnetic recording media and the adhesive property with an ink in use of printing are both increased greatly by laminating such a layer C.

As preferable low crystallinity resins, cycrohexanedimethanol copolymerized polyethylene terephthalate, isophthalic acid copolymerized polyethylene terephthalate, etc. can be employed. Desirable copolymerization ratio of such resins is in the range of 0.1–40 mol %.

Alternatively, the layer C is preferably composed of a copolymerized polyester, particularly, a copolymerized polyester containing a metal sulfonate. As the aromatic dicarboxylic acid of the copolymerized polyester containing a metal sulfonate, 5-sodium sulfoisophthalic acid, 2-sodium sulfoterephthalic acid, 4-sodium sulfoisophthalic acid, 4-sodium sulfo-2,6-naphthalene dicarboxylic acid, or a compound substituting other metals such as kalium or lithium for these metals, can be employed. Particularly, 5-sodium sulfoisophthalic acid is preferable. Although the thickness of such a layer C is not particularly restricted, the thickness is preferably not less than 0.01 $\mu$m.

Furthermore, an antistatic property can be given to the layer C. The surface resistivity of the layer C is preferably not more than $1 \times 10^{14}$ Ω/□. Coextrusion and coating are both possible to laminate this antistatic resin on the base film. Good running ability and handling ability can be achieved by the high-density and uniform-height protrusions formed by the particles contained in the layer A, and at the same time a good antistatic property can be obtained by such a layer C. Excellent stable running ability can be obtained by suppressing the electric charge of the film during running of the film. As a resin capable of realizing such an antistatic property, sodium dodecylbenzene sulfonate can be employed.

Further, if carbon black and/or conductive particles are contained in the layer C, the antistatic property can be given more positively and the stable running ability can be further increased. As the conductive particles, tin oxide particles, indium oxide particles, zinc particles or tin particles can be used. As the result that the stable running ability is increased, for example, because the running condition of the tape in use of a magnetic tape is stabilized, the shaking of image can be prevented. The content of the carbon black and/or conductive particles may be decided depending upon uses and purposes, and it may be appropriately selected from the range of 5–80 wt %.

The above-described low crystallinity resin and antistatic resin may be both laminated as the layer C. The order of the lamination of the resin layers is not particularly restricted. In the case where the adhesive property is required more strongly, the low crystallinity resin layer may be located on the surface side. In the case where the antistatic property is required more strongly, the antistatic resin layer may be located on the surface side. In the film thus laminated by both the low crystallinity resin and antistatic resin, the adhesive property and the antistatic property can be both increased, and in addition, the dropout property in use of a magnetic recording media also can be improved.

Still further, in the present invention, the layer C may be made as a layer which substantially does not contain particles. Such a layer C can be formed by any of coextrusion and coating. Since the particles are concentratively contained in the adjacent layer A and thereby the protrusions are formed at a high density and a uniform height as aforementioned, by covering the layer A with the very thin layer C, the particle density ratio at surface layer can be surely maintained to a lower value. As a result, the chipping resistance of the film surface can be further increased. Although the thickness of such a layer is not particularly restricted, the range of not more than 5 μm is preferable.

Furthermore, in the case where particles are contained in the layer C, the mean diameter of the particles is preferably smaller than the mean diameter of the particles contained in the layer A or the layer B. By controlling in such a manner, the protrusions on the surface formed by the particles contained in the layer A or the layer B basically are not damaged by the particles contained in the thin layer C. The smaller surface protrusions caused by the particles contained in the layer C are formed, for example, on the protrusions formed by the particles contained in the layer A, and thereby further reducing the friction coefficient of the film surface. Therefore, the scratch resistance and the chipping resistance can be further increased.

In the case where the film according to the present invention is used for a magnetic recording media, the magnetic layer M is preferably laminated as follows.

In the case where the layer C having a thickness of 1–300 nm is laminated on the laminated film composed of the layer A and the layer B, the magnetic layer M is preferably laminated on the layer C. In the case where the low crystallinity resin layer whose crystallization parameter $\Delta$ Tcg is not less than 80° C. is laminated as the layer C, the magnetic layer M is preferably laminated on the layer C. In the case where the antistatic resin layer whose surface resistivity is not more than $10^{14}$ Ω/□ is laminated as the layer C, the magnetic layer M is preferably laminated on the layer A or the layer C. In the case where the above low crystallinity resin layer and antistatic resin layer are laminated as the layer C, the magnetic layer M is preferably laminated on the layer C. In the case where the layer C contains carbon black and/or conductive particles by 5–80 wt %, the magnetic layer M is preferably laminated on the layer A or the layer C. In the case where the layer C substantially does not contain particles or the layer C contains the particles having a mean diameter of smaller than that of the particles contained in the layer A or the layer B, the magnetic layer M is preferably laminated on the layer A.

Next, a process for producing the biaxially oriented laminated film according to the present invention will be explained. However, the process is not particularly restricted by the following one.

As the method for containing particles in the thermoplastic resin layer A, although the particles may be contained in a process of any of before, during or after the polymerization, the method wherein the particles are blended into the polymer by using a vent-type twin-screw extruder is effective to obtain the film having the surface formation according to the present invention. As the method for controlling the content of the particles, a method for making master polymer (pellets) having a high concentration by the above method and diluting the master polymer with polyester which substantially does not contain particles when the film is produced is effective to obtain the film having the surface formation according to the present invention. Further, the method for controlling the crystallization parameter $\Delta$ Tcg to 30°–80° C. by controlling the melt viscosity or copolymerization composition of the high-concentration master polymer is effective to form the film having the surface formation according to the present invention without occurring of breakage.

After the pellets A containing particles are sufficiently dried, the pellets A are supplied to an extruder and molten at a temperature of not lower than the melting point and not higher than the thermal decomposition point. In the case where the layer B and the layer C are laminated by coextrusion, the polymers of the layer B and the layer C are supplied to a lamination device as aforementioned together with the above polymer of the layer A, a sheet is delivered out from a slit of a die and the sheet is cooled and solidified on a casting drum to make a non-oriented film. Namely, these thermoplastic resin polymers are laminated by using two or three extruders and a feed block for two or three layers (for example, a feed block having a rectangular shaped lamination portion). In use of such a feed block, the difference between the melt viscosities of the thermoplastic resins is preferably controlled to be in the range of 0–2000 poise, more preferably 0–1000 poise to stably and industrially obtain the film having the surface formation according to the present invention without irregularity in the width direction.

Next, this multi-layer non-oriented film is biaxially stretched to form a biaxially oriented film. Although a sequential biaxial stretching and a simultaneous biaxial stretching can be both employed as the stretching process, a process for using a sequential biaxial stretching wherein firstly longitudinal stretching and secondly transverse stretching are carried out is effective to stably and industrially form the film according to the present invention without irregularity in the width direction. In such a sequential biaxial stretching, preferably, the longitudinal stretching is divided into three or more stages, the temperature is controlled at 40°–150° C., the draw speed is controlled at 1000–50000%/min and the total draw ratio of the longitudinal stretching is set to 3 to 6 times, to efficiently obtain the film having the surface formation according to the present invention. In the transverse stretching, the temperature is preferably controlled in the range of 80°–170° C., and the draw speed is preferably controlled at 1000–20000%/min. The draw ratio is preferably set to 3–10 times. If necessary, further stretching may be performed in at least on direction of the longitudinal and transverse directions. Further, the method for stretching the film at an area stretching ratio (longitudinal stretching ratio×transverse stretching ratio) of not less than 9 times after the very thin layer containing particles is laminated may be employed.

Next, the stretched film is heat treated. The heat treatment is preferably performed under the condition of release, slight stretching or constant length, at a temperature of 160°–260° C., for 0.5–60 seconds. It is desired to use a micro-wave heating together with another usual heating because the surface formation of the film according to the present invention can be obtained more easily.

The timing of the lamination of the layer C may be at the process of the die or the feed block, before the longitudinal stretching after the die, before the transverse stretching or after the transverse stretching. Further, the layer C may be laminated by coating or melt lamination in a off-line process after the above film formation. However, in the case where the layer C is a very thin layer, it is preferred that the layer C is laminated before or after the transverse stretching and the laminated layer C is maintained in a condition of non-contact with rollers etc. until the layer C is fixed or solidified.

In the lamination of the layer A and the layer B according to the present invention as described above, the thin layer A containing particles prepared by using the high particle concentration master polymer made by a specified method and having a specified range of thermal properties is laminated on the layer B, and thereafter the laminated film is biaxially stretched. Therefore, a laminated film produced by other methods such as a method wherein, after a film is uniaxially stretched, a layer A is laminated by coating and the laminated film is further stretched, or a method wherein a layer A is laminated by coating on a biaxially stretched film, cannot reach the characteristics achieved by the laminated film according to the present invention. Further, the laminated film according to the present invention is excellent in production cost as compared with the laminated films produced by other methods.

Next, methods for determining the characteristics in the present invention and estimating the effects according to the present invention will be explained.

(1) Mean Diameter of Particles:

Polymer is removed from the film by plasma low temperature ashing treatment to expose the particles. The condition of the ashing treatment is selected such that the particles are not damaged whereas the polymer is ashed. The exposed particles are observed by a scanning electron microscope (SEM) and the image of the particles is processed by an image analyzer. The magnification of the SEM is about 2,000 to 10,000 times, and a visual field per one determination is appropriately selected from the range of one side length of 10 to 50 μm. Changing the portions to be observed, the volume mean diameter D of the particles of not less than 5,000 is determined from the diameters and volume rate thereof by the following equation.

$$D = \Sigma Di \cdot Nvi$$

Where, Di is diameter of particle, and Nvi is volume rate thereof.

The number of the particles is determined from the volume rate of the particles which satisfy the relationship of the thickness of the laminated layer and the mean diameter and the determined value is changed to a value per 1 mm².

(2) Thickness of Laminated Layer:

The ratio of the density of the element originating from the particles contained at the highest density in the film to the density of the carbon in the polyester ($M^+/C^+$) determined by using secondary ion mass spectrum (SIMS) within the range of a depth of 3000 nm from the film surface is defined as the particle density, and the analysis is carried out along the thickness direction of the film down to the depth of 3000 nm. The particle density in the outermost layer increases as distanced from the surface because the surface constitutes a boundary surface.

In the film according to the present invention, the particle density becomes the maximum at a depth and thereafter decreases again. Based on this particle density curve, a depth, at which the particle density becomes half of the maximum value, is defined as the thickness of the laminated layer (this depth is greater than the depth causing the maximum particle density).

The measuring conditions are as follows.

① Measuring apparatus:
  Secondary ion mass spectrum analysis apparatus (SIMS);
  A-DIDA3000 produced by ATOMIKA (Germany)
② Measuring conditions:
  Primary ion species; $O_2^+$
  Primary ion acceleration voltage; 12 KV
  Primary ionic current; 200 nA
  Raster area; 400 μm □
  Analysis area; gate 30%
  Degree of vacuum for measurement; $6.0 \times 10^{-9}$ Torr
  E-GUN; 0.5 KV-3.0 KV In a case where the particles contained at the highest density within the range of 3000 nm from the film surface is inorganic particles, because the determination by SIMS is difficult, the thickness of the laminated layer may be determined by measuring the depth profile of the particle density by X-ray photoelectron spectrum (XPS) or infrared spectroscopic analysis (IR) while etching from the surface, and determining in a manner similar to the above-described manner. Further, the thickness may be determined by observing the cross section of the film with a electron microscope and recognizing the boundary of the layer from the variation state of the particle density and/or the difference of the contrasts due to the different kinds of polymers. Furthermore, the thickness may be determined by, after delaminating the laminated polymer layer, using a level difference measuring apparatus for thin membranes.

(3) Number of Protrusions on Film Surface, Height of the Same:

The height data of the protrusions measured with a two beam and two detector type scanning electron microscope (ESM-3200; produced by Elionics Corporation) and a cross section measuring apparatus (PMS-1; produced by Elionics Corporation) by scanning the surface of the film setting the planar portion of the surface as the base (height 0) is transferred to an image processor (IBAS-2000; produced by Karlzuis Corporation), and an image of the protrusions on the film surface is reconstructed on the display of the image processor. Then, the highest value among each height of the protrusion portions of a protrusion obtained by dividing the respective protrusion portions into two portions on the image of the protrusion is defined as the height of the protrusion, and this determination is repeated on the respective protrusions. The determination is repeated 500 times changing measuring portions, the number of the protrusions is determined by measuring the number of protrusions having a height of not less than 20 nm, and the average value of the heights of protrusions measured is defined as the mean height of protrusions. The magnification of the scanning electron microscope is 1000 to 8000 times. In some cases, the above data obtained by the SEM may be substituted by the data obtained by using a high precision light interference type three dimensional surface analyzer (TOPO-3D produced by WYKO Corporation; objective lens: 40–200 magnifications).

(4) Content of Particles:

The film is treated with a solvent which dissolves the thermoplastic resin but which does not dissolve the particles, and the particles are separated from the thermoplastic resin by centrifugation. The content of the particles is defined as the ratio of the weight of the separated particles to the total weight of the film (% by weight). Alternatively, as needed, the determination may be carried out by utilizing infrared spectrophotometry.

(5) Glass Transition Temperature Tg, Cold Crystallization Temperature Tcc, Crystallization Parameter Δ Tcg, Melting Point:

The measurement is performed by using a differential scanning calorimeter (DSC, type-II; produced by Perkin Elmer Corporation). The measuring conditions of the DSC are as follows.

Ten milligrams of a sample is placed in the DSC, and after the sample is fused at 300° C. for 5 minutes, the sample is rapidly cooled in nitrogen liquid. The rapidly cooled sample is heated at a rate of 10° C./min to find the glass transition temperature Tg. The heating is continued and the cold crystallization temperature Tcc is determined as a temperature of the crystallization exothermic peak temperature from the glass state. The heating is still continued and the melting point is determined as the peak temperature of fusion. The difference (Tcc−Tg) between the cold crystallization temperature Tcc and the glass transition temperature Tg is defined as the crystallization parameter Δ Tcg.

(6) Particle Density Ratio at Surface Layer:

The ratio of the density of the element originating from the particles contained in the film to the density of the carbon in the thermoplastic resin determined by using secondary ion mass spectrum (SIMS) is defined as the particle density, and the analysis is carried out along the direction of thickness of the film. The ratio A/B of the particle density A at the outermost point (at a depth of 0) measured by SIMS to the maximum particle density B measured by continuing the SIMS analysis along the direction of thickness of the film is defined as the particle density ratio at surface layer. In this determination, if impurities are contained in the film, the density ratio with the elements of the impurities is sometimes detected together with the above analysis. However, this density ratio originating from the impurities should be neglected on the analysis. The measuring apparatus and the measuring conditions are the same as those described in the above item (2).

(7) Particle Diameter Ratio:

The particle diameter ratio is defined as the ratio of the mean value of the long diameters and the mean value of the short diameters of the particles measured in the above item (1). The respective mean values are determined by the following equations.

long diameter = $\Sigma D1i/N$ short diameter = $\Sigma D2i/N$

Where, D1i and D2i represent the long diameter (maximum diameter) and the short diameter (minimum diameter) of the respective particles, and N represents total number of the determined particles.

(8) Surface Resistivity of Film:

The film to be determined is placed on a relatively thick rubber sheet so that the measuring surface is at the upper side. A pair of rectangular electrodes of brass having a length equal to the length of a side of a square and a width of 1/10 of the length, whose bottom surfaces are polished in plane, are placed on the film such that the electrodes are positioned just at the sides of the square opposite to each other. While a pressure of 0.2 kg/cm$^2$ is applied on the electrodes, the electrical resistivity between the electrodes is measured as the surface resistivity of the film. In this measurement, the size of the electrodes may be appropriately selected depending upon the film to be determined. The unit of the surface resistivity is $\Omega/\square$.

(9) Observation of Cross Section of Film:

Apparatus: electric field radiating type scanning electron microscope (type S-800; produced by Hitachi Corporation)

Accelarating voltage: 10 kV

Cutting: making a sample by depositing carbon on the surface cut by a freezing microtome

(10) Particle Density:

The particles are recognized by the above observation of cross section utilizing the difference between the contrasts of the polymer and the particles, and the number of the particles are counted by an image analyzer etc. The magnification is selectively set from the range of 5000–100000 times and the data resulted from the observation in a sufficient field (usually 0.5 mm$^2$) is changed to a data per 1 mm$^2$, and this data is defined as the particle density.

(11) Relative Standard Deviation of Particle Diameter:

The relative standard deviation of particle diameter is represented by the value ($\sigma/D$) calculated by dividing the standard deviation ($\sigma = \{\Sigma(Di-D)^2/N\}^{\frac{1}{2}}$) calculated from the respective particle diameters Di, mean diameters D and number of particles N (which are measured in the above item (1)) by mean diameters D.

(12) Thickness of Skin Layer on Protrusion Portion:

In the above item (9), only the protrusion portions are observed, the distance from the top of the protrusion portion to the particle is defined as the thickness of skin layer on the protrusion portion, and the mean value of 500 protrusions is defined as the thickness of skin layer on protrusion portion of the film. The magnification is 40,000–100,000 times.

In the case where the layer C exists on the surface to be determined, the determination and observation are carried out before the layer C is laminated.

Further, the data similar to the above value can be obtained by Rutherford back scattering spectral analysis. The principle is that high-energy ion is deposited from the film surface, the energy of He ion jumping out from the interior of the film by the elastic scattering of atomic nuclei (Rutherford scattering) is determined, and the information of the distribution of elements near the film surface is obtained from the He ion energy. The measuring conditions are as follows.

Apparatus: back scattering spectral analyzing apparatus (AN-2500; Nissin High Voltage Corporation)
Measuring Conditions:
① incident ion:⁴He+
② incident energy:2.0 MeV
③ ion current:5 nA
④ amount of incidence:40 μC
⑤ diameter of ion beam:1 mmφ
⑥ incident angle:0 degree
⑦ scattering angle:160 degrees
⑧ multichannel analyzer:2 keV/channel
⑨ energy resolving power:18 keV The depth profile of the particle density is determined from the spectrum obtained by the above measurement, and the depth from the film surface a, wherein the particle density is half of the maximum value, is defined as the thickness of the skin layer on the protrusion (where, when the depth at the maximum particle density point is represented as b, a is smaller than b). As the density of number of atoms used when the information obtained by Rutherford back scattering spectral analysis is changed to the thickness, the value determined from the molecular structure of the repeated unit of the thermoplastic resin is employed. When the thermoplastic resin is polyethylene terephthalate, the value of $9.7 \times 10^{22}/cm^3$ can be used as the density of number of atoms.

(13) Thickness of Layer with Uneven Particle Distribution:

The observation described in the above item (9) is carried out at 20,000 magnifications, and the photographs of 500 planes (width×length: 12×8 cm, the width direction is parallel to the film surface) are taken changing positions. From the photographs, the mean value of the distance from the planar portion of the surface to the bottom of the particle uneven distributed portion is defined as the thickness of layer with uneven particle distribution.

(14) Irregularity in Width Direction of Area Ratio of Protrusion Portions:

The area ratio of protrusion portions of the film is measured in the width direction of a film roll, and the value (%) obtained by multiplying a/b (obtained by dividing the difference "a" between the maximum and the minimum of the area ratio of protrusion portions by the mean value "b") by 100 is defined as the irregularity in width direction of area ratio of protrusion portions. Where, the entire width of the film roll deleting both edge portions by 10 mm is divided into 50 portions, and the above measurement is carried out on the medium portions of the respective 50 portions.

(15) Surface Roughness:

The surface roughness of the film is measured by a surface roughness meter. The measuring conditions are as follows, and the mean value of 20 measurements is defined as the surface roughness. The measuring apparatus is ET-10 produced by Kosaka Kenkyusyo Corporation.
Radius of the tip of probe:0.5 μm
Load of the probe:5 mg
Measuring length:1 mm
Cut off:0.08 mm

(16) Waviness Index:

The surface roughness curve obtained by removing the cut off from the curve measured in the above item (15) is read, and waviness components having a wave length of not less than 50 μm are taken out by frequency analysis and the maximum amplitude thereof is defined as the waviness. The measurement is repeated 20 times, and the mean value of the resulted data is defined as the waviness index.

(17) Young's Modulus:

Young's modulus is measured at 25° C. and 65% RH using a tensile tester, based upon the method defined in JIS-Z-1702.

(18) Melt Viscosity:

The melt viscosity is determined at a temperature of 290° C. and a shear rate of $200^{-1}$, using a flow tester.

(19) Molecular Orientation at Surface (Refractive Index):

The molecular orientation at surface is determined by using a light source of sodium D ray (wave length: 589 nm) and using an Abbe refractometer. Methylene iodide is used as the mount liquid, and the measurement is carried out under the conditions of a temperature of 25° C. and a humidity of 65% RH. When the refractive indexes in the longitudinal, transverse and thickness directions are represented by N1, N2 and N3, respectively, the biaxial orientation can be represented by the condition that the absolute value of (N1-N2) is not more than 0.07 and N3/{N1+N2)/2} is not more than 0.95. The refractive index may be measured by laser type refractometer. Further, if it is difficult to determine by the above method, total reflection laser Raman method can be employed. In the total reflection laser Raman method, the total reflection Raman spectrum is measured by Ramanor U-1000 Raman system produced by Jobin-Yvon Corporation, for example, in the measurement of polyethylene terephthalate, the fact, that the polarimetry ratio of the band intensity ratio of 1615 $cm^{-1}$ (skeletal vibration of benzene ring) and 1730 $cm^{-1}$ (stretching vibration of carbonyl group) corresponds to the molecular orientation, can be utilized. (Where, the polarimetry ratio is, for example, ratio of YY/XX. YY: the polarization direction of the laser is set to Y and Raman ray parallel to the Y is detected. XX: the polarization direction of the laser is set to X and Raman ray parallel to the X is detected.) The biaxial orientation of the polymer can be determined by changing the parameter obtained from the Raman method to the refractive indexes in the longitudinal and transverse directions, and calculating the absolute values thereof and the difference therebetween. In such a measurement, the measuring conditions are as follows.
① Light source: argon ion laser (5145 Å)
② Setting of sample:
  A total reflection prism is pressed onto the film surface, and the incident angle of laser into the prism (angle relative to the thickness direction of the film) is set to 60 degrees.
③ Detector:
  PM: RCA31034/Photon Counting System (Hanamatsu C1230) (supply: 1600 V)
④ Measuring conditions:
  Slit:1000 μm
  Laser:100 mW
  Gate time:1.0 sec
  Scan speed:12 $cm^{-1}$/min
  Sample interval:0.2 $cm^{-1}$
  Repeat time:6

(20) Scratch Resistance:

The film is slitted into a tape with a width of ½ inch, and using a tape running tester, the slitted sample is run on the guide pin (surface roughness: Ra=100 nm) (running speed: 1000 m/min, running times: 10 passes, winding angle: 60 degrees, running tension: 70 g). After the running, the scratches resulted on the film surface are observed by a microscope. If the number of the scratches having a width of not less than 2.5 μm per the width of the tape is less than 2, the scratch resistance is determined to be excellent. If the number of the scratches is not less than 2 and less than 10, the scratch resistance is determined to be good. If the number of the scratches is not less than 10, the scratch resistance is determined not to be good. Although the "excellent" rank is desired, the "good" rank is practically usable.

(21) Chipping Resistance:

A single-edged blade is perpendicularly brought into contact with a film tape slitted at a width of ½ inch, and in the state where the blade is further pressed into the tape by 0.5 mm in depth, the tape is run by 20 cm (running tension: 500 g, running speed: 6.7 cm/sec.). After this running, the height of the substance chipped away from the surface of the tape and adhering onto the edge of the blade is determined by observation using a microscope, and this height is defined as the amount of chipping (unit:μm). If the chipping amount with respect to at least one surface of the film is not more than 10 μm, the chipping resistance is determined to be good. If the chipping amount is greater than 10 μm, the chipping resistance is determined not to be good. This value of 10 μm is the critical value of whether the film powder generated by the abrasion of the film surface in the process such as printing or calendering affects the process or the quality of the product or not.

(22) Durability of Magnetic Surface:

The reduction of S/N of a magnetic tape is measured after the tape passes through a domestic VTR 1000 times, and the durability in practical use is determined by this reduction. If the reduction is less than 1 dB, the durability of the magnetic surface is determined to be good.

(23) Adhesive Property with Magnetic Layer:

A commercial polyester adhesive tape (width: 19 mm) is adhered onto the magnetic coating layer at a length of 30 mm, and the adhesive tape is removed at a time. Using a haze meter (SEP-H-2 type; produced by Nihon Seimitsu Kougaku Corporation), the total ray transmittance of the portion from which the adhesive tape is removed is determined based upon the method of JIS-K-7105, and the adhesive property with magnetic layer is evaluated by determining the residual amount of the magnetic coating layer by the following equation.

Residual amount of the magnetic coating layer $$D=(T_0-T_1)/T_0 \times 100 \ (\%)$$

Where, $T_0$: total ray transmittance (%) before coating of the magnetic layer $T_1$: total ray transmittance (%) of the portion from which the adhesive tape is removed

| Value of D | Estimation |
|---|---|
| less than 20% | X: Adhesive property is not good and the object of the present invention cannot be achieved. |
| not less than 20% and less than 40% | Δ: Adhesive property is not good and the object of the present invention cannot be achieved. |
| not less than 40% and less than 60% | ○: Adhesive property is good and the object of the present invention can be achieved. |
| not less than 60% | ⊚: Adhesive property is good and the object of the present |

| Value of D | Estimation |
|---|---|
|  | invention can be achieved. |

(24) Adhesive Property with Ink:

An ink for cellophane (CC-ST White; produced by Toyo Ink Corporation) is coated on the film using a metering bar so that the solid component thereof is about 3 g/m², and the coated ink is dried at 60° C. for one minute by heated air. A cellophane adhesive tape (produced by Nichiban Corporation) is laminated on the ink printed surface of the film, and the adhesive tape is delaminated at an angle of 90 degrees. After the delamination, the adhesive property with ink of the film is evaluated by the area of the residual ink. The criteria of the evaluation are as follows.

| Residual area (%) | Evaluation of adhesive property |
|---|---|
| not less than 90% and less than 100% | ○ |
| not less than 75% and less than 90% | Δ |
| less than 75% | X |

In the evaluation, and Δ are sufficient for practical use.

(25) Antistatic Property:

The film is slitted to prepare a tape with a width of ½ inch. The tape is set in a tape running tester (SFT-700; produced by Yokohama System Kenkyusyo Corporation) and is run on the guide pin (surface roughness: 0.2 S) (running speed: 3.3 cm/sec, going-back running times: 100 passes, winding angle: 180 degrees). The initial friction coefficient μ ko and the maximum friction coefficient μ kmax during 100 passes are determined by the following equation.

$$\mu k = 0.733 \log(T_2/T_1)$$

Where, $T_1$ is the entrance side tension and $T_2$ is the exit side tension.

The antistatic property is estimated by the increase of the friction coefficient, that is, the difference between the maximum friction coefficient μ kmax and the initial friction coefficient μ ko.

If the (μ kmax−μ ko) is not more than 0.02, the antistatic property is determined to be good. If the (μ kmax−μ ko) is more than 0.02, the antistatic property is determined not to be good. The value of 0.02 of (μ kmax−μ ko) is a value for judging whether a stable running ability can be obtained without the increase of friction coefficient due to electric charge or not, for example, when the film is used for a magnetic tape.

(26) Quality of Picture on Magnetic Recording Media (Chromatic S/N):

A magnetic coating solution with the following composition is coated on the film by using a gravure roll and the coated magnetic layer is dried and magnetically oriented. After the coated film is calendered by a small-sized test calendering apparatus (steel roll/nylon roll; 5 stages) at a temperature of 70° C. and a line pressure of 200 kg/cm, the film is cured at a temperature of 70° C. for 48 hours. The film is slitted to a tape with a width of ½ inch, and the tape is incorporated into a VTR cassette by a length of 250 m to make a VTR cassette tape.

(Composition of magnetic coating solution)(All parts are by weight.)

- Co-containing iron oxide (BET value: 50 m²/g): 100 parts
- Ethlec A (produced by Sekisui Chemical Corporation, Vinyl chloride/vinyl acetate copolymer): 10 parts
- Nipporan 2034 (produced by Nippon Polyurethane Corporation, Polyurethane elastomer):10 parts
- Coronate L (produced by Nippon Polyurethane Corporation, Polyisocyanate) 5 parts
- Lecitin 1 part
- Methylethylketone 75 parts
- Methylisobutylketone: 75 parts
- Toluene: 75 parts
- Carbon black : 2 parts
- Lauric acid : 1.5 parts 100% chromatic signal generated by a television testing wave generator (TG7/U706, produced by Shibasoku Corporation) is recorded in the above tape using a domestic VTR, and chromatic S/N (unit: dB) is determined from the regenerated signal using a color video noise measuring apparatus (925D/1).

(27) Running Ability (Friction Coefficient $\mu$ k):

The film is slitted to prepare a tape with a width of ½ inch. The tape is set in a tape running tester (SFT-700; produced by Yokohama System Kenkyusyo Corporation) and is run on the guide pin (diameter: 6 mm$\phi$, material: SUS27, surface roughness: 0.2 S) (running speed: 3.3 cm/sec, winding angle: 90 degrees) at 20° C. and 60% RH. The initial friction coefficient $\mu$ k is determined by the following equation.

$$\mu k = 2/\pi \ln(T_2/T_1)$$

Where, $T_1$ is the entrance side tension and $T_2$ is the exit side tension.

If the friction coefficient $\mu$ k obtained is not more than 0.3, the running ability is determined to be good. If the friction coefficient $\mu$ k is more than 0.3, the running ability is determined not to be good. The value of 0.3 of the friction coefficient $\mu$ k is a value for judging whether a good handling ability can be obtained or not, when the film is processed to a magnetic recording media, capacitor, package, etc.

(28) Dropout on Magnetic Tape:

The signal generated by a television testing wave generator (TG-7/1, produced by Shibasoku Corporation) is recorded in the magnetic tape using a domestic VTR, and thereafter, the tape is run by 100 passes (120 min×100 passes) at 25° C. and 50% RH. Using a dropout counter, the dropouts with a width of not less than 5 $\mu$ and wherein the attenuation of the regenerated signal is not less than $-16$dB are picked up and they are counted as the dropout. The measurement is carried out with 10 cassettes. If the number of dropouts per one minute is less than 10, the dropout is determined to be good. If the number of dropouts per one minute is not less than 10, the dropout is determined not to be good.

(29) Roll Formation:

After a film roll is placed in an atmosphere at 40° C. and 80% RH for six months, the film roll is observed and occurrence of wrinkles (longitudinal and transverse directions) are determined. If the wrinkles are not generated at all, the roll formation is determined to be excellent. If the wrinkles are generated only up to 200 m from the surface of the roll, the roll formation is determined to be good. If the wrinkles are generated over the 200 m, the roll formation is determined not to be good.

Although the roll formation is desired to be rank "excellent", even rank "good" is sufficient for practical use.

EXAMPLES AND COMPARATIVE EXAMPLES

Preferred examples will be hereinafter explained together with comparative examples.

Examples 1–8, Comparative Examples 1–8 (Table 2)

Ethylene glycol slurry containing crosslinked polystyrene particles and spherical silica particles originating from colloidal silica, which had mean diameters different from each other, was prepared. After the ethylene glycol slurry was heat treated at 190° C. for 1.5 hours, the ethylene glycol slurry was subjected to the transesterification with terephthalic acid dimethyl, and was polymerized to prepare polyethylene terephthalate (hereinafter, referred to as PET) pellets containing the particles at a content of 0.3–55 wt %. Thermoplastic resin $A_r$ was prepared using the pellets. Thermoplastic resin $B_r$ was prepared by producing a PET containing spherical silica particles with a diameter of 0.03 $\mu$m at a content of 0.3 wt % prepared by a regular method.

These polymers were dried under a pressure reducing condition (3 Torr) at 180° C. for 3 hours, respectively. The thermoplastic resin $A_r$ was supplied to an extruder No. 1 and molten at 285° C., and the thermoplastic resin $B_r$ was supplied to an extruder No. 2 and molten at 280° C. These molten polymers were laminated in a feed block having a rectangular lamination portion. The laminated polymer was delivered out from a die in a form of a sheet onto a casting drum controlled at 30° C. and applied with electrostatic casting method, and the sheet was cooled and solidified to make a non-stretched film with two-layer structure or three-layer structure in which both surface layers were composed of the thermoplastic resin $A_r$. The total thickness of the film and the thickness of the layer A composed of the thermoplastic resin $A_r$ were controlled by controlling the discharge amounts of the respective extruders. (However, comparative example 7: single layer of layer A, comparative example 8: single layer of layer B.)

The non-stretched film obtained was stretched in the longitudinal direction at a temperature of 80° C. and a draw ratio of 4.5 times. This longitudinal stretching was performed at four stages using four sets of pairs of rollers. Layer C was coated on thus obtained uniaxially stretched film in the condition as shown in Table 2. The coated uniaxially stretched film was stretched in the transverse direction at a draw speed of 2000%/min, a temperature of 100° C. and a draw ratio of 4.0 times using a stenter, and thereafter, the biaxially stretched film was heat treated at 200° C. for five seconds under the condition of the longitudinal tension of 2 kg/m to make a biaxially oriented laminated film whose total thickness was 15 $\mu$m and whose thickness of layer A was 0.03–4 $\mu$m. The result of the estimation on this film is shown in Table 2.

Examples 9–16, Comparative Examples 9–13 (Tables 3, 4)

In the manner similar to those of the above examples, the non-stretched films having three-layer lamination structure wherein the polymer different from that of the layer B was laminated on both surfaces of the layer B were prepared in examples 9–16, the non-stretched films having two-layer lamination structure obtained by using two extruders were prepared in comparative examples 11–13, and the non-stretched films having three-layer lamination structure obtained by using three extruders were prepared in comparative examples 9 and 10.

The non-stretched film obtained was stretched in the longitudinal direction at a temperature of 80° C. and a draw ratio of 4.2 times. Layer C was coated on the uniaxially stretched film in the condition as shown in Tables 3 and 4. The coated uniaxially stretched film was stretched in the transverse direction at a draw speed of 2000 %/min, a temperature of 105° C. and a draw ratio of 4.5 times using a stenter, and thereafter, the biaxially stretched film was heat treated at 190° C. for five seconds under the condition of a constant length to make a biaxially oriented laminated film. The result of the estimation on these films is shown in Tables 3 and 4.

With the above examples 1–8 and comparative examples 1–8, the scratch resistance, chipping resistance, durability of the magnetic surface and S/N on the layer C side were estimated. With the above examples 9–12 and comparative examples 9–11, the adhesive properties with magnetic layer and ink on the layer C side were estimated. With the above examples 13–16 and comparative examples 12 and 13, the antistatic property on the layer C side was estimated. As shown in Tables 2–4, the respective properties aimed in the present invention were satisfied in examples 1–16, but they were not satisfied in the comparative examples.

TABLE 2

| | Particles in resin $A_r$ | | | Thickness of layer A ($\mu$m) | Layer C Material |
|---|---|---|---|---|---|
| | Kind | Mean diameter ($\mu$m) | Content (wt %) | | |
| Example 1 | spherical silica | 0.3 | 5 | 0.2 | water soluble polymer A |
| Example 2 | sphirical silica | 0.3 | 5 | 0.2 | water soluble polymer B |
| Example 3 | spherical silica | 0.3 | 5 | 0.2 | water soluble polymer A |
| Example 4 | spherical silica | 0.45 | 0.8 | 0.3 | water soluble polymer A |
| Example 5 | spherical silica | 0.3 | 20 | 0.3 | water soluble polymer A |
| Example 6 | spherical silica | 0.1 | 3 | 0.08 | water soluble polymer B |
| Example 7 | spherical silica | 1.5 | 3 | 2 | water soluble polymer B |
| Example 8 | crosslinked polystylene | 0.3 | 3 | 0.2 | water soluble polymer B |
| Cmparative Example 1 | spherical silica | 0.8 | 0.5 | 0.05 | water soluble polymer A |
| Comparative Example 2 | spherical silica | 0.8 | 0.3 | 0.3 | water soluble polymer A |
| Comparative Example 3 | spherical silica | 0.3 | 3 | 4 | water soluble polymer A |
| Comparative Example 4 | spherical silica | 0.45 | 3 | 0.03 | water soluble polymer A |
| Comparative Example 5 | spherical silica | 0.45 | 55 | 0.3 | water soluble polymer A |
| Comparative Example 6 | spherical silica | 0.45 | 0.05 | 0.3 | water soluble polymer A |
| Comparative Example 7 | sphercial silica | 0.3 | 5 | (single layer of layer A) | water soluble polymer A |
| Comparative Example 8 | spherical silica | — | — | (single layer of layer B) | water soluble polymer A |

| | Layer C Thickness (nm) | Scratch resistance | Chipping resistance | durability of magnetic surface | S/N (dB) |
|---|---|---|---|---|---|
| Example 1 | 30 | excellent | good | good | +4.0 |
| Example 2 | 5 | excellent | good | good | +4.0 |
| Example 3 | 80 | excellent | good | good | +4.0 |
| Example 4 | 30 | good | good | good | +3.0 |
| Example 5 | 30 | excellent | good | good | +4.5 |
| Example 6 | 30 | good | good | good | +5.0 |
| Example 7 | 30 | good | good | good | +3.0 |
| Example 8 | 30 | excellent | good | good | +3.5 |
| Cmparative Example 1 | 0.5 | not good | not good | not good | +1.5 |
| Comparative Example 2 | 330 | not good | not good | good | 0 (standard) |
| Comparative Example 3 | 30 | not good | not good | good | +2.0 |
| Comparative Example 4 | 30 | not good | not good | not good | +1.5 |
| Comparative Example 5 | 30 | not good | not good | not good | 0 |
| Comparative Example 6 | 30 | not good | good | not good | +0.5 |
| Comparative Example 7 | 30 | not good | not good | not good | +2.0 |
| Comparative Example 8 | 30 | not good | good | not good | 0 |

| water soluble polyer A | epoxidated polydimethylsiloxane emulsion: | 61.5 wt % |
|---|---|---|
| | silane coupling agent: | 7.7 wt % |
| | methylcellulose: | 30.8 wt % |
| water soluble | epoxidated polydimethylsiloxane emulsion: | 69.8 wt % |

TABLE 2-continued

| polyer B | silane coupling agent: | 7.0 wt % |
| | methylcellulose: | 23.2 wt % |

TABLE 3

| | Particles in resin $A_r$ | | | Thickness of layer A ($\mu$m) | Mean height of protrusions of layer A ($\mu$m) |
| --- | --- | --- | --- | --- | --- |
| | Kind | Mean diameter | Content (wt %) | | |
| Example 9 | spherical silica | 0.45 | 3 | 0.3 | 0.15 |
| Example 10 | spherical silica | 0.45 | 3 | 0.3 | 0.15 |
| Example 11 | spherical silica | 0.45 | 3 | 0.3 | 0.15 |
| Example 12 | crosslinked polystylene | 0.3 | 3 | 0.2 | 0.12 |
| Comparative Example 9 | spherical silica | 0.45 | 3 | 3.5 | 0.08 |
| Comparative Example 10 | spherical silica | 0.45 | 0.05 | 2.0 | 0.07 |
| Comparative Example 11 | (single layer of layer B) | — | — | — | — |

| | Layer C | | Adhesive Property with magnetic layer | Adhesive property with ink |
| --- | --- | --- | --- | --- |
| | Kind | Material | | |
| Example 9 | low crystalline resin | cyclohexanedimethanol* 20 mol % coporimerized PET | ⊙ | ○ |
| Example 10 | low crystalline resin | cyclohexanedimethanol* 20 mol % coporimerized PET | ⊙ | ○ |
| Example 11 | low crystalline resin | cyclohexanedimethanol 20 mol % coporimerized PET | ⊙ | ○ |
| Example 12 | low crystalline resin | cyclohexanedimethanol 20 mol % coporimerized PET | ⊙ | ○ |
| Comparative Exampl 9 | low crystalline resin | cyclohexanedimethanol 20 mol % coporimerized PET | Δ | X |
| Comparative Example 10 | low crystalline resin | cyclohexanedimethanol 20 mol % coporimerized PET | Δ | X |
| Comparative Example 11 | low crystalline resin | cyclohexanedimethanol 20 mol % coporimerized PET | Δ | X |

*PET: polyethylene terphthalate

TABLE 4

| | Particles in resin $A_r$ | | Thickness of layer A ($\mu$m) | Layer C | | Antistatic property |
| --- | --- | --- | --- | --- | --- | --- |
| | Kind | Mean diameter ($\mu$m) | Content (wt %) | | Kind | Material |
| Example 13 | spherical silica | 0.45 | 3 | 0.3 | antistatic resin | carbon black (diameter: 0.05 $\mu$m 30% contained) | good |
| Example 14 | spherical silica | 0.45 | 3 | 0.3 | antistatic resin | tin oxide 30% contained | good |
| Example 15 | spherical silica | 0.45 | 3 | 0.3 | antistatic resin | indium oxide 30% contained | good |
| Example 16 | crosslinked polystylene | 0.3 | 3 | 0.2 | antistatic resin | carbon black (diameter: 0.05 $\mu$m) 30% contained | good |
| Comparative Example 12 | spherical silica | 0.05 | 3 | 0.6 | (layer C is not laminated) | | not good |
| Comparative Example 13 | crosslinked polystyrene | 0.3 | 0.3 | 0.2 | (layer C is not laminated) | | not good |

Examples 17-22, Comparative Examples 14-17 (Table 5)

Ethylene glycol slurry containing crosslinked polystyrene particles and spherical silica particles originating from colloidal silica, which had mean diameters different from each other, was prepared. The ethylene glycol slurry was subjected to the transesterification with terephthalic acid dimethyl or 2,6-naphthalene dicarboxylic acid dimethyl, and was polymerized to prepare polyethylene terephthalate (PET) pellets and polyethylene-2,6-naphthalate (PEN) containing the particles (thermoplastic resin $A_r$). Thermoplastic resin $B_r$ was prepared by producing PET and PEN which do not contain particles by a regular method.

These polymers were dried under a pressure reducing condition (3 Torr) at 180° C. for 6 hours, respectively. The thermoplastic resin $B_r$ was supplied to an extruder No. 1 and molten at 310° C., and the thermoplastic resin $A_r$ was supplied to an extruder No. 2 and molten at 280° C. These molten polymers were laminated in a feed block having a rectangular lamination portion (the ratio of the width/the height of the lamination portion=2). The laminated polymer was delivered out from a die in a form of a sheet onto a casting drum controlled at 45° C. and applied with electrostatic casting method, and the sheet was cooled and solidified to make a non-stretched film with two-layer structure or three-layer structure in which both surface layers were composed of the thermoplastic resin $A_r$. The total thickness of the film and the thickness of the layer A composed of the thermoplastic resin $A_r$ were controlled by controlling the discharge amounts of the respective extruders. (However, comparative examples 16 and 17: single layer of layer A.)

The non-stretched film obtained was stretched in the longitudinal direction at a temperature of 80° C. (when the thermoplastic resin $B_r$ was PEN, at a temperature of 140° C.) and a draw ratio of 4.0 times. This longitudinal stretching was performed at three stages using three sets of pairs of rollers. Layer C was coated on thus obtained uniaxially stretched film in the condition as shown in Table 5. Corona discharge treatment was conducted on one surface of the uniaxially stretched film in the atmosphere, and the following water soluble solution for forming the layer C was coated on the treated surface by gravure coating. The thickness of the coating was controlled so that the thickness of the coated layer after drying became 100 nm. The water soluble solution had the following composition C. (composition C)

(A) water soluble copolymerized polyester composed of terephthalic dimethyl/5-sodium sulfoisophthalic acid dimethyl (87.5/12.5)/ethylene glycol (100)

(B) carnauba wax (A) of 95 parts by weight and (B) of 5 parts by weight (solid component ratio) were mixed and the mixture was diluted with water to 3 wt % to prepare the water soluble solution for forming the layer C.

The coated uniaxially stretched film was stretched in the transverse direction at a draw speed of 5000%/min, a temperature of 100° C. (when the thermoplastic resin $B_r$ was PEN, at a temperature of 140° C.) and a draw ratio of 4.0 times using a stenter, and thereafter, the biaxially stretched film was heat treated at 190° C. for five seconds under the condition of a constant length to make a biaxially oriented laminated film whose total thickness was 15 μm. Further, a biaxially oriented single-layer film containing spherical silica particles with a mean diameter of 0.2 μm at a content 0.2 wt % over the entire film was made at the same total thickness of 15 μm. Furthermore, a biaxially oriented single-layer film with the same total thickness of 15 μm containing spherical silica particles with a mean diameter of 0.3 μm at a content 6 wt % over the entire film was made.

The characteristics of these films are shown in Table 5. In the films satisfying the requirements according to the present invention (examples 17–22), good properties of S/N, scratch resistance and adhesive properties with magnetic layer and ink could be obtained.

Examples 23–28, Comparative Examples 18–20 (Table 6)

Polyethylene terephthalate (PET) and polyethylene-2,6-naphthalate (PEN) containing silica particles originating from colloidal silica and divinylbenzene/stylene copolymerized crosslinked particles was prepared (thermoplastic resin $A_r$). This thermoplastic resin $A_r$ and various thermoplastic resins $B_r$ were supplied to extruders No. 1 and No. 2, respectively, and molten at 290° C. These molten polymers were laminated in a feed block and was delivered out from a die in a form of a sheet onto a casting drum controlled at 45° C. and applied with electrostatic casting method, and the sheet was cooled and solidified to make a non-stretched film. The lamination structure of the non-stretched film was controlled to two-layer structure (A/B) or three-layer structure (A/B/A) by changing the feed block. The total thickness of the film and the thickness of the layer A composed of the thermoplastic resin $A_r$ were controlled by controlling the discharge amounts of the respective extruders. (However, comparative examples 23: single layer of layer A.)

The non-stretched film obtained was stretched in the longitudinal direction at a temperature of 90° C. (when the thermoplastic resin $B_r$ was PET) or at a temperature of 140° C. (when the thermoplastic resin $B_r$ was PEN) and a draw ratio of 4.0 times. Layer C was coated on thus obtained uniaxially stretched film in the condition as shown in Table 6. Corona discharge treatment was conducted on one surface of the uniaxially stretched film in the atmosphere, and the following water soluble solution for forming the layer C was coated on the treated surface by gravure coating. The thickness of the coating was controlled so that the thickness of the coated layer after drying became 80 nm. The water soluble solution had the following composition D. (composition D)

(A) water soluble copolymerized polyester composed of terephthalic dimethyl/5-sodium sulfoisophthalic acid dimethyl (87.5/12.5)/ethylene glycol (100)

(B) carnauba wax (A) of 90 parts by weight and (B) of 10 parts by weight (solid component ratio) were mixed and the mixture was diluted with water to 3 wt % to prepare the water soluble solution for forming the layer C.

The coated uniaxially stretched film was stretched in the transverse direction at a draw speed of 5000%/min, a temperature of 100° C. (when the thermoplastic resin $B_r$ was PEN, at a temperature of 140° C.) and a draw ratio of 4.2 times using a stenter, and thereafter, the biaxially stretched film was heat treated at 200° C. for five seconds under the condition of a constant length to make a biaxially oriented laminated film whose total thickness was 15 μm.

The characteristics of these films are shown in Table 6. In the films satisfying the requirements according to the present invention (examples 23–28), good properties of S/N and scratch resistance could be obtained. Further, the ranks of the adhesive property with magnetic layer of these examples were all rank "excellent" and the rank of the adhesive property with ink were all rank "good".

Examples 29–31, Comparative Examples 21–23 (Table 7)

In the manner similar to those of the above examples 23–28, various films with a total thickness of 15 μm and having different dispersions of area ratio of protrusion portions in the width direction were prepared by changing the ratio of the width/the height of the lamination portion of the feed block or the shape of the lamination portion. The obtained film was slitted by a center winding-surface winding both applied type slitter onto a bakelite core with a length of 1500 mm and an inner diameter of 6 inches at a width of 1100 mm and a length of 10,000 m to make a film roll.

After the obtained film roll was placed in an atmosphere with a temperature of 40° C. and a humidity of 80% RH for 6 months, the roll formation of the film roll was determined. As a result, if the conditions were all within the conditions specified by the present invention, the rank of the roll formation was rank "excellent" or rank "good", as shown Table 7.

TABLE 5

| | Particles in resin $A_r$ | | Thermoplastic resin | Uneven distribution of particles | Thickness of layer with uneven particle distribution (μm) |
|---|---|---|---|---|---|
| | Mean diameter (μm) | kind and content (wt %) | | | |
| Example 17 | 0.3 | colloidal silica 10 | A:I B:I | exist, one side | 0.6 |
| Example 18 | 0.3 | colloidal silica 8 | A:I B:I | exist, one side | 0.35 |
| Example 19 | 0.2 | colloidal silica 7 | A:II B:I | exist, both side | 0.4 |
| Example 20 | 0.45 | colloidal silica 5 | A:II B:II | exist, one side | 1.0 |
| Example 21 | 0.3 | titanium dioxide 10 | A:I B:I | exist, one side | 0.8 |
| Example 22 | 0.3 | crosslinked polystyrene 4 | A:I B:II | exist, both side | 0.45 |
| Comparative Example 14 | 0.2 | colloidal silica 7 | A:I B:I | exist, both side | 1.8 |
| Comparative Example 15 | 0.5 | calcium carbonate 10 | A:I B:I | exist, both side | 4 |
| Comparative Example 16 | 0.2 | colloidal silica 0.2 | A:I | none | — |
| Comparative Example 17 | 0.3 | colloidal silica 6 | A:I | none | — |

| | Layer C | S/N of magnetic recording media (dB) | Scratch resistance of surface of layer A (point) | Adhesive property with magnetic layer | Adhesive property with ink |
|---|---|---|---|---|---|
| Example 17 | composition C thickness: 100 nm | +2.0 | 4 | ⊙ | ○ |
| Example 18 | composition C thickness: 100 nm | +2.5 | 4 | ⊙ | ○ |
| Example 19 | composition C thickness: 100 nm | +1.8 | 4 | ⊙ | ○ |
| Example 20 | composition C thickness: 100 nm | +1.2 | 4 | ⊙ | ○ |
| Example 21 | composition C thickness: 100 nm | +1.0 | 3 | ⊙ | ○ |
| Example 22 | composition C thickness: 100 nm | +2.0 | 4 | ⊙ | ○ |
| Comparative Example 14 | none | −1.5 | 2 | X | X |
| Comparative Example 15 | none | −5.0 | 2 | X | X |
| Comparative Example 16 | composition C thickness: 100 nm | −0.5 | 1 | X | X |
| Comparative Example 17 | none | −3.5 | 1 | X | X |

Note 1:
lamination structure
example 17, 18, 20, 21: A/B/C
example 19, 22, compartive example 14: A/B/A/C
comparative example 15: A/B/A
comparative example 16, 17: single layer film
Note 2:
thermoplastic resin I: polyethylene terephthalate
thermoplastic resin II: polyethylene-2,6-naphthalate

TABLE 6

| | Particles in resin $A_r$ | | Thermoplastic resin | Ratio of thickness of layer A/mean diameter of particles | Area ratio of protrusion portions (%) | Waveness of portions other than protrusion portions | Layer C | S/N of magnetic recording media (dB) | Scratch resistance of surface of layer A (point) |
|---|---|---|---|---|---|---|---|---|---|
| | Mean diameter (μm) | Kind | | | | | | | |
| example 23 | 0.3 | colloidal silica | A:I B:1 | 0.6 | 40 | none | composition D thickness: 80 nm | +3.0 | 4 |
| example 24 | 0.3 | colloidal silica | A:I B:1 | 0.5 | 70 | none | composition D thickness: 80 nm | +2.5 | 4 |
| example 25 | 0.2 | crosslinked polystylene | A:II B:1 | 0.4 | 40 | none | composition D thickness: 80 nm | +3.0 | 4 |
| example 26 | 0.45 | colloidal silica | A:II B:1I | 0.5 | 25 | none | composition D thickness: 80 nm | +2.0 | 4 |
| example 27 | 0.3 | titanium dioxide | A:I B:1 | 0.5 | 30 | none | composition D thickness: 80 nm | +1.2 | 3 |
| example 28 | 0.3 | colloidal silica | A:I B:1 | 0.9 | 45 | none | composition D thickness: 80 nm | +1.5 | 3 |
| comparative | 0.3 | colloidal | A:I | 0.9 | 5 | none | composition D | −0.5 | 1 |

TABLE 6-continued

| | Particles in resin $A_r$ | | Thermoplastic resin | Ratio of thickness of layer A/mean diameter of particles | Area ratio of protrusion portions (%) | Waveness of portions other than protrusion portions | Layer C | S/N of magnetic recording media (dB) | Scratch resistance of surface of layer A (point) |
|---|---|---|---|---|---|---|---|---|---|
| | Mean diameter (μm) | Kind | | | | | | | |
| example 18 | | silica | B:I | | | | thickness: 80 nm | | |
| comparative example 19 | 0.3 | colloidal silica | A:I B:I | 2.5 | 3 | exist | none | −3.5 | 1 |
| comparative example 20 | 0.3 | colloidal silica | A:I (sinple layer) | 23 | 5 | exist | none | −5.0 | 1 |

Note:
lamination structure
example 23, 25-27: A/B/C
example 24, 28, comparative example 18: A/B/A/C
comparative example 19: A/B/A
comparative example 20: single layer
Thermoplastic resin I: polyethylene terephthlate
Thermoplastic resin II: polyethylene-2,6-naphthalate

TABLE 7

| | Particles in resin $A_r$ | | Thermoplastic resin | Ratio of thickness of layer A/ mean diameter of particles | Area ratio of protrusion portions (%) | Dispersion of area ratio of protrusion portions | Layer C | Roll formation |
|---|---|---|---|---|---|---|---|---|
| | Mean diameter (μm) | Kind | | | | | | |
| Example 29 | 0.3 | Colloidal Silica | A:I B:I | 0.6 | 40 | 25 | composition D thickness 80 nm | excellent |
| Example 30 | 0.3 | Colloidal Silica | A:I B:I | 0.5 | 70 | 20 | composition D thickness 80 nm | excellent |
| Example 31 | 0.2 | Crosslinked Polystylene | A:II B:I | 0.4 | 40 | 45 | composition D thickness 80 nm | good |
| Comparative Example 21 | 0.3 | Colloidal Silica | A:I B:I | 0.6 | 40 | 60 | none | not good |
| Comparative Example 22 | 0.3 | Colloidal Silica | A:I B:I | 0.6 | 50 | 80 | none | not good |
| Comparative Example 23 | 0.3 | Colloidal Silica | A:I B:I | 2.5 | 5 | 45 | none | not good |

Note:
Lamination structure
example 29: A/B/C
example 30, 31, comparative example 21, 23: A/B/A/C, comparative example 22: A/B/A
Thermoplastic resin I: polyethylene terephthate
II: polyethylene-2,6-naphthalate Although several preferred embodiments and many preferred examples of the present invention have been described herein in detail, it will be appreciated by those skilled in the art that various modifications and alterations can be made to these embodiments and examples without materially departing from the novel teachings and advantages of this invention. Accordingly, it is to be understood that all such modifications and alterations are included within the scope of the invention as defined by the following claims.

What is claimed is:

1. A biaxially oriented laminated film having protrusions of uniform height comprising:
   a film layer B whose major component is a thermoplastic resin $B_r$;
   a film layer A laminated on at least one surface of said film layer B and whose major components are a thermoplastic resin $A_r$ and particles contained therein, the film layer A having a thickness of 0.005-3 μm, the particles contained in the film layer A having a mean diameter of 0.1 to 10 times the thickness of the film layer A, the content of the particles in the film layer A being 0.5-50% by weight; and
   a skin layer C which comprises a polymer laminated on at least one surface of said laminated film layer A and film layer B and having a thickness of 1-300 nm.

2. The biaxially oriented laminated film according to claim 1, wherein said skin layer C which is adjacent to the film layer A contains particles having a mean diameter smaller than the mean diameter of the particles contained in said film layer A.

3. The biaxially oriented laminated film according to claim 1, wherein said particles are unevenly distributed up to a depth which is seven times the mean diameter of the particles from the surface of said film layer A in the thickness direction of the biaxially oriented laminated film.

4. The biaxially oriented laminated film according to claim 1, wherein, in the portion near at least one surface of the film in the thickness direction, the particle density D1 in the region up to a depth of 1.5 times the mean diameter of the particles from the film surface is not less than 80,000/mm$^2$, and the particle density D2 of particles, which exist in the region except the region within the depth of 1.5 times the mean diameter of the particles from the film surface, with a mean diameter of not less than the mean diameter of the particles contained in the region up to a depth of 1.5 times the mean diameter of the particles from the film surface, is not more than 1/10 of the particle density D1.

5. The biaxially oriented laminated film according to claim 1, wherein the thickness of the thermoplastic resin $A_r$ which covers the protrusions formed by said particles on the film surface is in the range of 5-200 nm.

6. The biaxially oriented laminated film according to claim 1, wherein the relative standard deviation of height distribution of the protrusions formed by said particles on the film surface is not more than 0.6.

7. The biaxially oriented laminated film according to claim 1, wherein the area ratio of the area of protrusion portions of the protrusions having a height greater than about 15 nm to the area formed by said particles on the film surface is in the range of 6-90%.

8. The biaxially oriented laminated film according to claim 1, wherein there is substantially no waviness on the planar portions of the film surface other than the protrusion portions of the protrusions formed by said particles on the film surface.

9. The biaxially oriented laminated film according to claim 1, wherein the waviness index of the film surface is not more than 50 nm.

10. The biaxially oriented laminated film according to claim 1, further comprising a magnetic layer on skin layer C, wherein said skin layer C has an adhesive property with respect to said magnetic layer.

11. The biaxially oriented laminated film according to claim 1, further comprising an ink on skin layer C, wherein said skin layer C has an adhesive property with respect to said ink.

12. The biaxially oriented laminated film according to claim 1, wherein said skin layer C has an antistatic property.

13. The biaxially oriented laminated film according to claim 1, wherein said film layer B contains particles and wherein said skin layer C which is adjacent to the film layer B contains particles having a mean diameter smaller than the mean diameter of the particles contained in said film layer B.

14. A biaxially oriented laminated film according to claim 1 wherein the mean height of the protrusions on the film surface is from 10-500 nm.

15. A biaxially oriented laminated film according to claim 1 wherein the mean height of the protrusions on the film surface is from 20-300 nm.

16. A biaxially oriented laminated film according to claim 1 wherein the mean height of the protrusions on the film surface is from 20-200 nm.

17. A biaxially oriented laminated film having protrusions of uniform height comprising:
- a film layer B whose major component is a thermoplastic resin $B_r$;
- a film layer A having a thickness of 0.005-0.3 μm laminated on at least one surface of said film layer B and whose major components are a thermoplastic resin $A_r$ and particles contained therein, the mean height of the protrusions formed on the surface of the film layer A by said particles being not less than 1/5 of the mean diameter of said particles; and
- a skin layer C which comprises a polymer laminated on at least one surface of said laminated film layer A and film layer B and having a thickness of 1-300 nm.

* * * * *